US010505859B2

(12) United States Patent
Kam et al.

(10) Patent No.: US 10,505,859 B2
(45) Date of Patent: Dec. 10, 2019

(54) PACKET DEADLINES IN A QUEUE TO CONTROL THE AGE OF INFORMATION

(71) Applicant: The Government of the United States of America, as represented by the Secretary of the Navy, Arlington, VA (US)

(72) Inventors: Clement Kam, Arlington, VA (US); Sastry Kompella, Silver Spring, MD (US); Gam D. Nguyen, Alexandria, VA (US); Anthony Ephremides, North Bethesda, MD (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 33 days.

(21) Appl. No.: 15/801,567

(22) Filed: Nov. 2, 2017

(65) Prior Publication Data
US 2018/0131625 A1 May 10, 2018

Related U.S. Application Data

(60) Provisional application No. 62/564,465, filed on Sep. 28, 2017, provisional application No. 62/420,016, filed on Nov. 10, 2016.

(51) Int. Cl.
*H04L 12/875* (2013.01)
*H04L 12/883* (2013.01)
*H04L 12/891* (2013.01)
*H04L 12/823* (2013.01)
*H04L 12/835* (2013.01)
*H04L 12/851* (2013.01)

(52) U.S. Cl.
CPC .......... *H04L 47/564* (2013.01); *H04L 47/30* (2013.01); *H04L 47/32* (2013.01); *H04L 47/41* (2013.01); *H04L 49/9021* (2013.01); *H04L 47/245* (2013.01)

(58) Field of Classification Search
CPC ....... H04L 47/564; H04L 47/30; H04L 47/32; H04L 49/9021; H04L 47/41; H04L 47/245
See application file for complete search history.

(56) References Cited

U.S. PATENT DOCUMENTS

| | | | |
|---|---|---|---|
| 6,728,270 B1 * | 4/2004 | Meggers | H04L 47/822 370/252 |
| 2001/0007570 A1 * | 7/2001 | Mangin | H04Q 11/0478 370/537 |
| 2003/0119556 A1 * | 6/2003 | Khan | H04L 47/14 455/560 |

(Continued)

*Primary Examiner* — Tejis Daya
(74) *Attorney, Agent, or Firm* — US Naval Research Laboratory; William P. Ladd

(57) ABSTRACT

Systems and method are provided for controlling the age of information, or information freshness, for remote status updating through the use of a packet deadline. In an embodiment, a packet deadline determines how long a packet is allowed to wait in a queue at the source before being transmitted, and, if the deadline expires, it is dropped from the system and never transmitted. This mechanism can control the flow of packets into the system, which can be used to control and optimize the age of information, thus providing a fresh status at a monitor.

16 Claims, 9 Drawing Sheets

(56) References Cited

U.S. PATENT DOCUMENTS

| | | | | |
|---|---|---|---|---|
| 2003/0235202 | A1* | 12/2003 | Van Der Zee | H04L 47/10 370/428 |
| 2006/0092867 | A1* | 5/2006 | Muller | H04H 20/16 370/312 |
| 2006/0222010 | A1* | 10/2006 | Bosch | H04L 1/1854 370/469 |
| 2007/0076625 | A1* | 4/2007 | Tahara | H04L 29/12028 370/252 |
| 2007/0201365 | A1* | 8/2007 | Skoog | H04L 47/10 370/230.1 |
| 2008/0071899 | A1* | 3/2008 | Odaka | H04L 41/06 709/223 |
| 2010/0054178 | A1* | 3/2010 | Wang | H04L 47/625 370/328 |
| 2012/0002669 | A1* | 1/2012 | Dietterle | H04L 12/417 370/389 |
| 2012/0076058 | A1* | 3/2012 | Padmanabh | H04L 47/41 370/310 |
| 2012/0092991 | A1* | 4/2012 | Jeong | H04L 47/25 370/235 |
| 2012/0307747 | A1* | 12/2012 | MacInnis | H04W 72/1242 370/329 |
| 2014/0328175 | A1* | 11/2014 | Pan | H04L 47/32 370/235 |
| 2015/0263939 | A1* | 9/2015 | Hasegawa | H04L 45/38 370/389 |
| 2015/0282086 | A1* | 10/2015 | Gupta | H04W 52/0229 455/574 |
| 2016/0191423 | A1* | 6/2016 | Srinivasan | H04L 49/3045 370/413 |

* cited by examiner

PACKET DEADLINES IN A QUEUE TO CONTROL THE AGE OF INFORMATION

CROSS REFERENCE TO RELATED APPLICATIONS

This application claims the benefit of U.S. Provisional Patent Application No. 62/420,016, filed on Nov. 10, 2016, and U.S. Provisional Patent Application No. 62/564,465, filed on Sep. 28, 2017, both of which are incorporated by reference herein in their entireties.

FIELD OF THE DISCLOSURE

This disclosure relates to computer networks, including computer network communication using packets.

BACKGROUND

Many systems are characterized by a source that transmits some status (e.g., sensor data, a list of neighboring nodes, social networking updates, a location, stock prices, etc.) to a monitor, where the objective is for the information observed at the monitor at any time be recently generated. A metric called the age of information or status age can be used to study the performance of such systems with the specific goal of characterizing the freshness of information at the monitor. The age at the time of observation can be defined as the amount of time elapsed from the generation of the status most recently received at the monitor to the current (observation) time.

Prior methods for controlling the age metric have several limitations. For example, choosing a queueing discipline to be last-come, first-served places the most recently generated packets in the front of the queue, giving them priority over older, more obsolete packets. A limitation of this approach is that all packets that enter in the queue are intended to be sent, regardless of how old they are. Thus, very stale information that is no longer useful can clog up the system (e.g., clogging up buffers and needlessly sending information that is no longer useful).

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 1A:
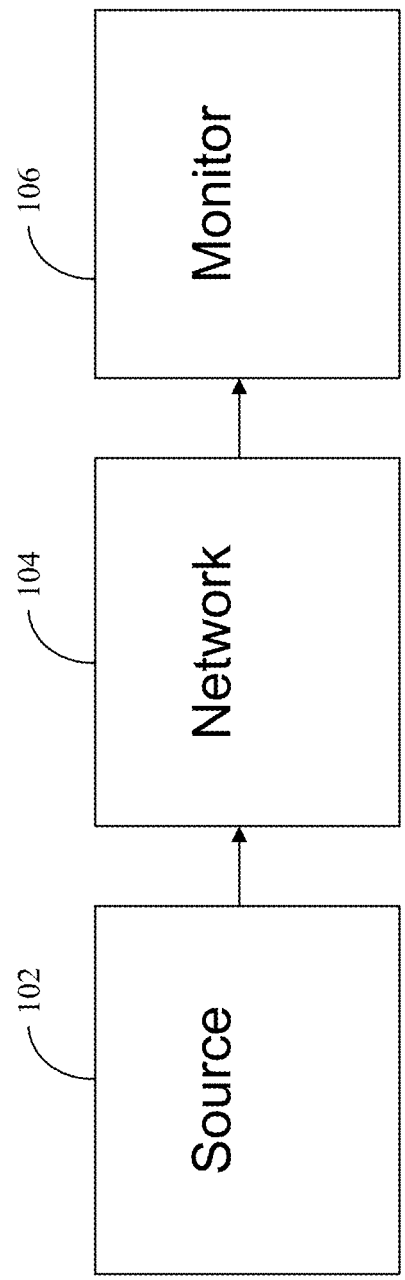
FIG. 1A is a diagram of an exemplary status updating system in accordance with an embodiment of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of this discussion, the term "module" shall be understood to include one of software, or firmware, or hardware (such as circuits, microchips, processors, or devices, or any combination thereof), or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

1. Overview

Embodiments of the present disclosure can minimize the age of information ("age") for packets averaged over time by removing packets that have been in a queue longer than a time set by a packet deadline. Removing packets from a system using a packet deadline can provide an overall performance improvement for the age of information of the status updating process. For example, removing packets using a packet deadline in accordance with embodiments of the present disclosure avoids needless congestion (e.g., in buffers) caused by storing old information that is no longer useful for applications and further avoids expenses, delays, etc. associated with transmitting this old information.

In an embodiment, the packet deadline is selected to avoid removing packets too quickly (resulting in fewer updates) and to avoid having too many packets in queue, which causes information to become stale. Embodiments of the present disclosure can include the use of a dynamic packet deadline, which can be different for each packet. The dynamic deadline can be set based on feedback from the system, such as the age, channel condition, congestion, or packet success rate, and the deadline can be adjusted accordingly. Also, instead of a fixed deadline, the deadline can be chosen randomly according to some probability distribution to produce some desired characteristic of the age of transmitted update packets.

Embodiments of the present disclosure can save network resources, such as energy and bandwidth, and can reduce network congestion and interference. Another advantage is that a deadline can be used in conjunction with existing mechanisms, such as packet generation rate, queueing discipline, buffer size, and packet replacement, and in most cases can further improve the age performance.

2. Age of Information

FIG. 1A is a diagram of an exemplary status updating system in accordance with an embodiment of the present disclosure. In FIG. 1, a source 102 is tracking some status (e.g., environmental readings, traffic congestion, internet connection status information, sensor data, stock prices, etc.) over time. At various points in time, source 102 generates status update packets and transmits them to a remote monitor 106, possibly over a network 104. Monitor 106 receives the status updates from source 102 sometime after the packets are generated, delayed by queueing delay and various sources of transmission delay (e.g., contention, routing, propagation, etc.). In an embodiment, monitor 106 keeps track of the latest status that has been received according to the generation times of the updates (i.e., timestamps). For example, packets can be stamped with a time of generation and/or a time of receipt (e.g., by monitor 106). In an embodiment, the age of information is given by the equation $\Delta(t)=t-u(t)$, where $u(t)$ is the timestamp of the latest update message available at the monitor at time t. As time t progresses without additional updates $u(t)$, the age of information $\Delta(t)$ increases, and the freshness of the information decreases because the information becomes more and more out of date over time. While source 102 and monitor 106 are shown as separated by network 104 in FIG. 1A, it should be understood that, in an embodiment, source 102 and monitor 106 can also be implemented on a single device or on two separate devices linked together over a communication link (e.g., over a USB connection).

Figure 1B:
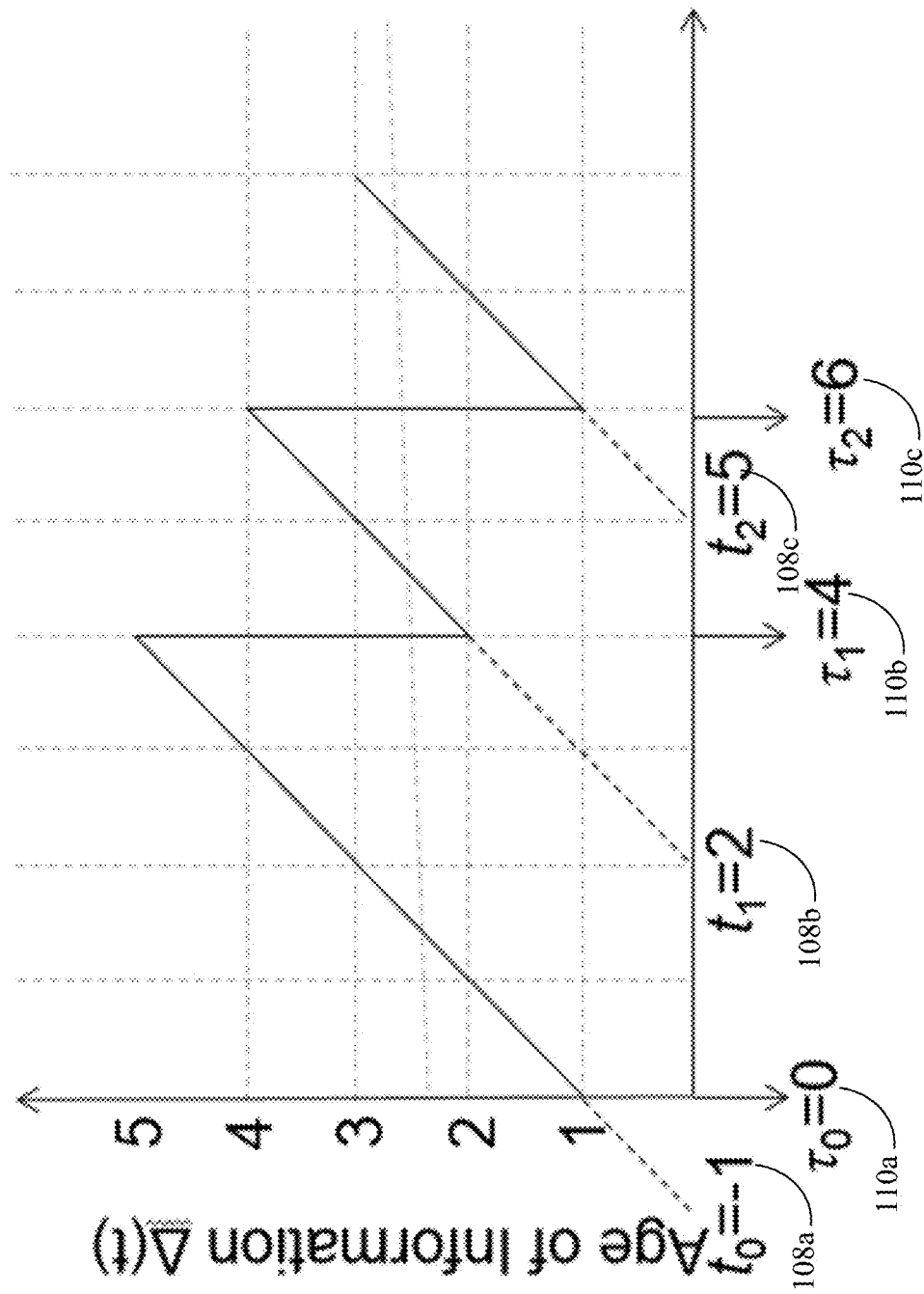
FIG. 1B is a diagram illustrating age of information in accordance with an embodiment of the present disclosure.

FIG. 1B is a diagram illustrating age of information in accordance with an embodiment of the present disclosure. In FIG. 1B, the age of information $\Delta(t)$ (e.g., in seconds) is plotted on the vertical axis and the current time is plotted on the horizontal axis (e.g., in seconds). In FIG. 1, times of generation of updates by source 102 are shown as t 108. In FIG. 1, times of receipt of updates by monitor 106 are shown as $\tau$ 110. At time $t_0=-1$ 108a, a first update is generated at source 102. At time $\tau_b=0$ 110a, monitor 106 receives the first update. At the time of receipt of the first update, the age of the first update is already one second old ($0-(-1)=1$). At time $t_1=2$ 108b, a second update is generated at source 102. At time $\tau_1=4$ 110b, monitor 106 receives the second update. At the time of receipt of the second update, age of the first update is 5 seconds old ($4-(-1)=5$), and the age of the second update is 2 seconds old ($4-2=2$). Since the second update is newer, the age of information $\Delta(t)$ becomes 2. At time $t_2=5$ 108c, a third update is generated at source 102. At time $\tau_2=6$ 110c, monitor 106 receives the third update. At the time of receipt of the third update, age of the second update is 4 seconds old ($6-2=4$), and the age of the third update is 1 second old ($6-5=1$). Since the third update is newer, the age of information $\Delta(t)$ becomes 1. As time progresses with no additional updates, the age of information $\Delta(t)$ increases.

In some embodiments, monitor 106 can receive updates from multiple sources 102 sending different kinds of information. For example, in an embodiment, a first source can send updates to monitor 106 regarding temperature data, and a second source can send updates to monitor 106 regarding wind speed data. In an embodiment, each type of update can be assigned a separate age $\Delta(t)$. For example, monitor 106 may receive frequent wind speed updates but infrequent temperature updates. In such a case, the age of the temperature updates would be larger than the age of the wind speed updates. In an embodiment, source 102 can send multiple types of updates to monitor 106. For example, in an embodiment, source 102 can send both temperature and wind speed updates to monitor 106, each associated with a different age, depending on the time monitor 106 receives the last packet corresponding to each type of update.

3. Packet Deadlines

Embodiments of the present disclosure can minimize the age of packets averaged over time by setting a deadline for a packet at which time it will expire. For example, in an embodiment, if a packet for an update of a particular measurement is older than a predetermined threshold amount (the packet deadline), the update may no longer be relevant information because it is not sufficiently current to be useful for an application at monitor 106. In an embodiment, once a packet has reached the packet deadline, it can be removed from the buffer or queue (e.g., because there is no point in sending it to server 106 if server 106 cannot use the information).

The packet deadline can be set using a variety of techniques in accordance with embodiments of the present disclosure. For example, in an embodiment, the packet deadline can be set based on a rate of update generation. In an embodiment, the packet deadline can be set based on the service rate—how quickly the server generates packets (e.g., update generation (rate of going into a queue) vs service rate (rate of going out of the queue). The packet deadline can also be set based on other factors, such as the number of devices in the network, current network congestion, etc.

In an embodiment, the packet deadline can be set manually (e.g., at the source 102, at monitor 106, and/or at some point in network 104) or autonomously (e.g., by a controller). The deadline can be static (e.g., for a particular type of measurement), or it can be dynamic so that it can be changed to be longer or shorter (e.g., depending on current network conditions such as buffer congestion and/or data transmission speed). In an embodiment, the deadline can only be changed so that new packets are assigned the changed deadline and old packets remain assigned with the previous deadline. In another embodiment, the deadline for a particular packet can be changed (e.g., based on current network conditions). Further, in an embodiment, deadlines can vary depending on a type of packet. For example, in an embodiment, a deadline for a stock price may be shorter than a deadline for a temperature reading (e.g., because the stock data may be more time sensitive).

Figure 2A:
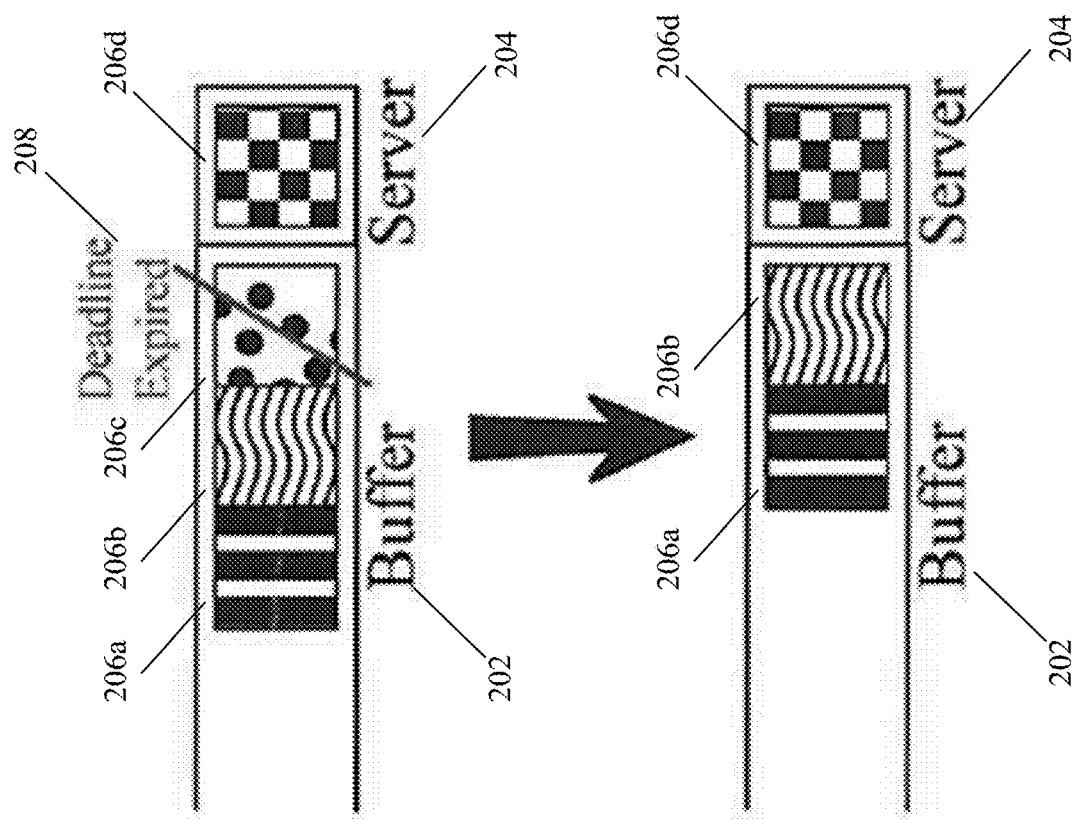
FIG. 2A is a diagram illustrating exemplary packet deadline operation in accordance with an embodiment of the present disclosure.

FIG. 2A is a diagram illustrating exemplary packet deadline operation in accordance with an embodiment of the present disclosure. In FIG. 2A, packets 206a, 206b, 206c, and 206d enter a queue (e.g., buffer 202 at source 102) and are assigned deadlines. In an embodiment, the packet 206d currently being transmitted (or next in line to be transmitted) from source 102 is sent to server 204, while other packets 206a, 206b, and 206c waiting to be transmitted remain in buffer 202. In an embodiment, server 204 is a network interface configured to serve output data 216. In an embodiment, each packet 206 is assigned a fixed deadline to be some constant time after the time of entry into the queue. In an embodiment, once a deadline for a particular packet expires, the packet is removed from buffer 202. For example, in an embodiment, packet 206c is the oldest packet in buffer 202. If the deadline for packet 206c expires 208 before packet 206c is sent to server 204, packet 206c can be removed from buffer 202.

4. Packet Deadline Modes

In an embodiment, there are two modes in which a deadline can be applied. For example, in an embodiment, the first is the non-preemptive mode, in which a packet (e.g., packet 206c) is dropped from the buffer (e.g., buffer 202) if its deadline expires prior to entering the server (e.g., server 204). In the non-preemptive mode, once a packet enters the server (e.g., server 204), the packet is never dropped from the system. For example, if the deadline for packet 206d expires before packet 206d is transmitted (or, in an embodiment, before packet 206d has finished being transmitted) from source 102, packet 206d remains in server 204 and is not removed if non-preemptive mode is applied.

In an embodiment, the second mode is the preemptive mode, in which a packet can be dropped either from the buffer (e.g., buffer 202) or the server (e.g., server 204) if its deadline expires prior to the completion of service. For example, if the deadline for packet 206d expires before packet 206d is transmitted (or, in an embodiment, before packet 206d has finished being transmitted) from source 102, packet 206d is removed from server 204 if preemptive mode is applied.

Figure 2B:
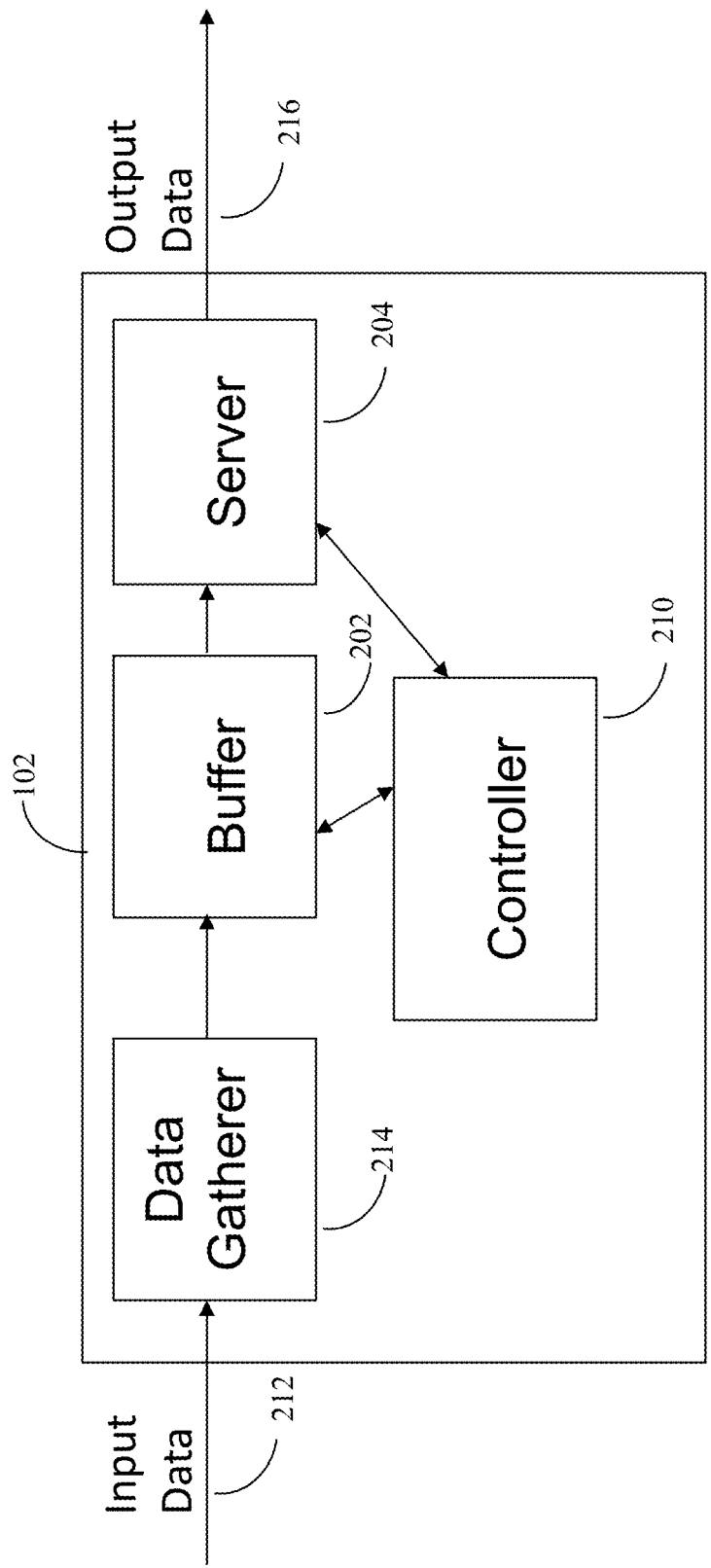
FIG. 2B is a diagram of an exemplary source device in accordance with an embodiment of the present disclosure.

In an embodiment, source device 102 can include a controller (e.g., to assign packet deadlines and/or to determine which mode to use for removing packets). FIG. 2B is a diagram of an exemplary source device 102 in accordance with an embodiment of the present disclosure. In FIG. 2B, source device 102 includes controller 210, which can communicate with buffer and/or server 204, to assign packet deadlines and to determine whether source device 102 should operate in non-preemptive mode or in preemptive mode.

In FIG. 2B, source device also includes (optional) data gatherer 214. In an embodiment, data gatherer 214 gathers and/or receives input data 212 to be encapsulated in packets and sent to buffer 202 as output data 216 for transmission to monitor 106. For example, in an embodiment, data gatherer 214 is (or includes) a sensor. In an embodiment, data gatherer 214 senses data (e.g., from the environment), packetizes the data, and sends the packets to buffer 202. While data gatherer 214 is shown as part of source device 102 in FIG. 2B, it should be understood that, in an embodiment, all or part of data gather 214 can be implemented on a separate device (e.g., a separate sensor device) in communication with source device 102. For example, in an embodiment, an external sensor device can communicate input data 212 to data gatherer 214, which can packetize the sense data and send it to buffer 202. Further, in an embodiment, controller 210 can also communicate with and/or control data gatherer 214.

In an embodiment, controller 210 assigns deadlines to packets as they enter buffer 202. As discussed above, in an embodiment, the deadlines can vary depending on the type of information. Further, in an embodiment, controller 210 can monitor conditions (e.g., environmental conditions, network congestion, network speed, etc.) and can change assigned deadlines based on current conditions.

In an embodiment, controller 210 determines and/or controls the mode (e.g., non-preemptive mode or preemptive mode) for source device 102. For example, in an embodiment, if controller 210 is set to non-preemptive mode, controller removes packets with expired deadlines from buffer 202 but does not remove packets with expired deadlines from server 204. In an embodiment, if controller 210 is set to preemptive mode, controller 210 removes packets with expired deadlines from buffer 202 and from server 204. For example, in an embodiment, controller 210 can sense the state of buffer 202 and server 204 and can send an instruction to buffer 202 and/or server 204 to remove one or more packets with expired deadlines.

In an embodiment, controller 210 can change the mode (e.g., in response to a user command or dynamically). For example, in an embodiment, controller 210 can change the mode from non-preemptive mode to preemptive mode or from preemptive mode to non-preemptive mode based on changing conditions, such as changing network, changing conditions relating to data sensed by data gatherer 214, etc.

In an embodiment, a packet can be sent to a destination via a plurality of devices, and the deadline can expire after it leaves a first device but before it reaches a destination device. For example, in an embodiment, server 204 can send a packet to an intermediary device before the packet reaches a destination device, and the deadline of the packet can expire when the packet reaches the intermediary device. In an embodiment, a controller (e.g., controller 210 or another controller) can send a message instructing the packet to be removed from a buffer and/or server at the intermediary device before the packet is sent to the destination device. For example, in an embodiment, controller 210 can send a message to the intermediary device instructing the intermediary device (e.g., another controller at the intermediary device) to remove the packet.

In an embodiment, before a packet leaves a source device, a controller (e.g., controller 210) can calculate an approximate time for the packet to reach a destination device, and the controller can send an instruction (e.g., to buffer 202 and/or server 204) to remove the packet if the controller determines that the packet deadline corresponding to the packet will expire before the packet reaches the destination device. In an embodiment, an intermediary device can receive a packet that has already been assigned a deadline (e.g., by a source device, such as source device 102), and a controller at the intermediary device can remove the packet (e.g., from a buffer and/or server at the intermediary device) if the packet deadline expires after the packet leaves the source device but before the packet leaves the intermediary device.

The elements of FIG. 2B can be implemented using hardware, software, and/or a combination of hardware and software and can be implemented on one device or on a combination of devices. For example, in an embodiment, data gatherer 214, buffer 202, server 204, and controller 210 are all implemented on a single chip of a device. The elements of FIG. 2B can be implemented using a general purpose computer or a special purpose device. For example, in an embodiment, the elements of FIG. 2B are implemented as part of a special purpose device designed to sense, packetize, and transmit certain kind(s) of information. Further, the elements of FIG. 1 can be implemented using hardware, software, and/or a combination of hardware and software and can be implemented on one device or on a combination of devices.

5. Exemplary Simulation Results

Figure 3A:
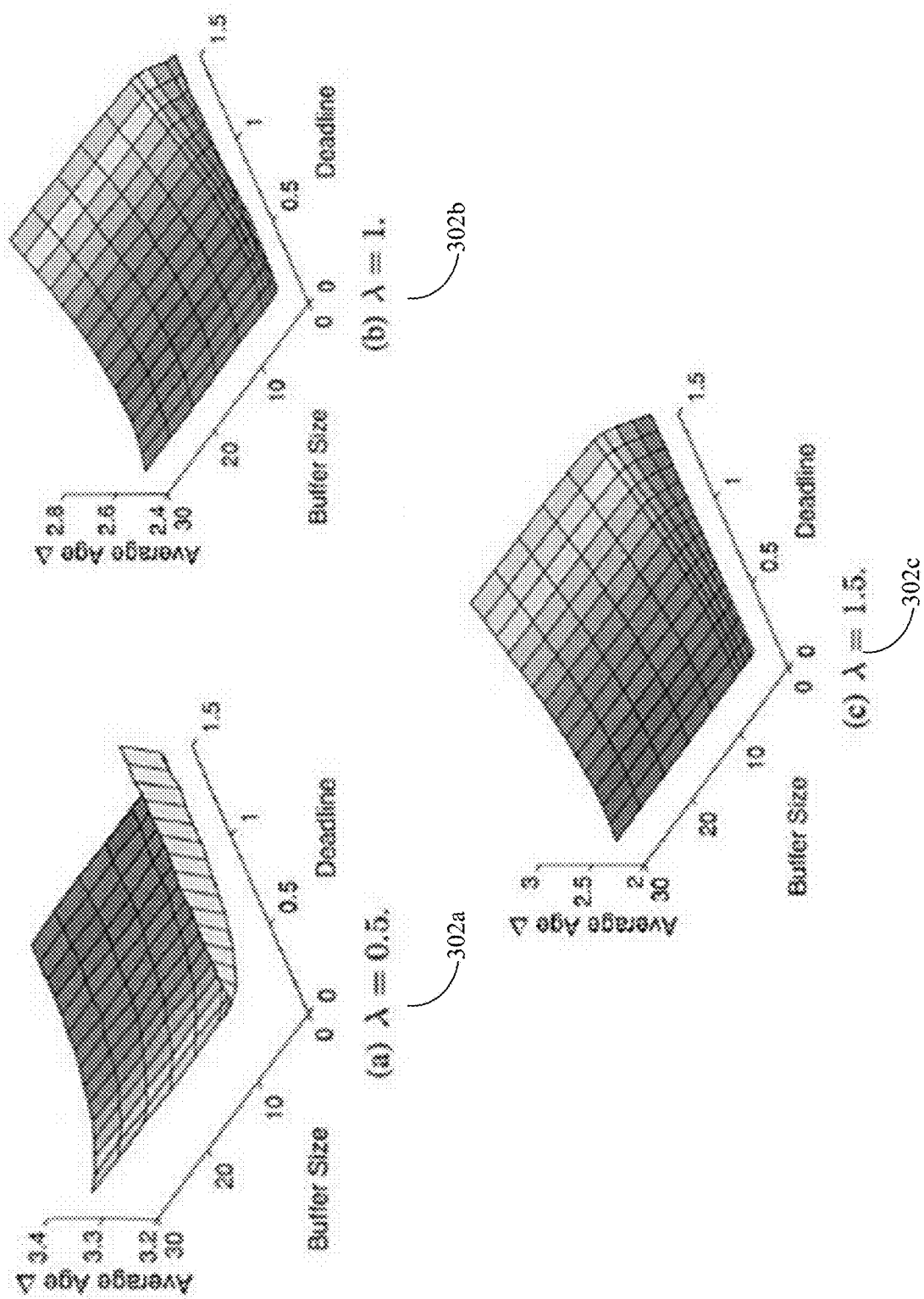
FIG. 3A shows a series of simulation results for age averaged over time for a Memoryless arrival process, Memoryless service process, l server, k total system capacity (M/M/l/k) queue with a service rate of $\mu=1$ in non-preemptive mode in accordance with an embodiment of the present disclosure.

FIG. 3A shows a series of simulation results for age averaged over time for a Memoryless arrival process, Memoryless service process, l server, k total system capacity (M/M/l/k) queue with a service rate of $\mu=1$ in non-preemptive mode in accordance with an embodiment of the present disclosure. FIG. 3A shows simulation results for the age averaged over time for an M/M/l/k queue with a service rate of $\mu=1$ in non-preemptive mode. For a smaller packet arrival rate ($\lambda$) (e.g., $\lambda=0.5$ in FIG. 3(a) 302a), increasing the deadline reduces the age, and larger buffer sizes seem to do better, since more packets are stored and the deadline prevents them from getting too stale in the buffer. For $\lambda=1$ (FIG. 3(b) 302b), the age first decreases and then increases as deadline increases, and a similar phenomenon is observed with the buffer size. If the deadline is too small, then packets are removed too quickly which leads to fewer updates. If a deadline is too large, packets can get too stale and it would be better to drop them and wait for another packet to arrive. For a properly chosen deadline, the buffer size should also be carefully chosen for this value of $\lambda$. For a larger $\lambda$ (e.g., $\lambda=1.5$ (FIG. 3(c) 302c), a lower age is achieved with a smaller deadline, since packets are generated frequently enough to be trimmed via deadline, so, in effect, fresh packets are sent at a sufficiently high rate. Exemplary optimal ages for the four values of $\lambda$ are shown in Table 1. Overall, as $\lambda$ increases, the minimum average age decreases, and it is achieved by reducing the deadline, since more arrivals requires more aggressively trimming the packets in queue. In an embodiment, the buffer size does not exhibit as clear of a trend.

TABLE 1

Optimum average age, non-preemptive mode

| $\lambda$ | Minimum Age | Optimal Buffer Size | Optimal Deadline | % Improvement vs. No Deadline |
|---|---|---|---|---|
| 0.5 | 3.2258 | 19 | 1.2 | 1.80% |
| 1 | 2.4454 | 24 | 0.5 | 2.17% |
| 1.5 | 2.2369 | 14 | 0.3 | 1.48% |

Figure 3B:
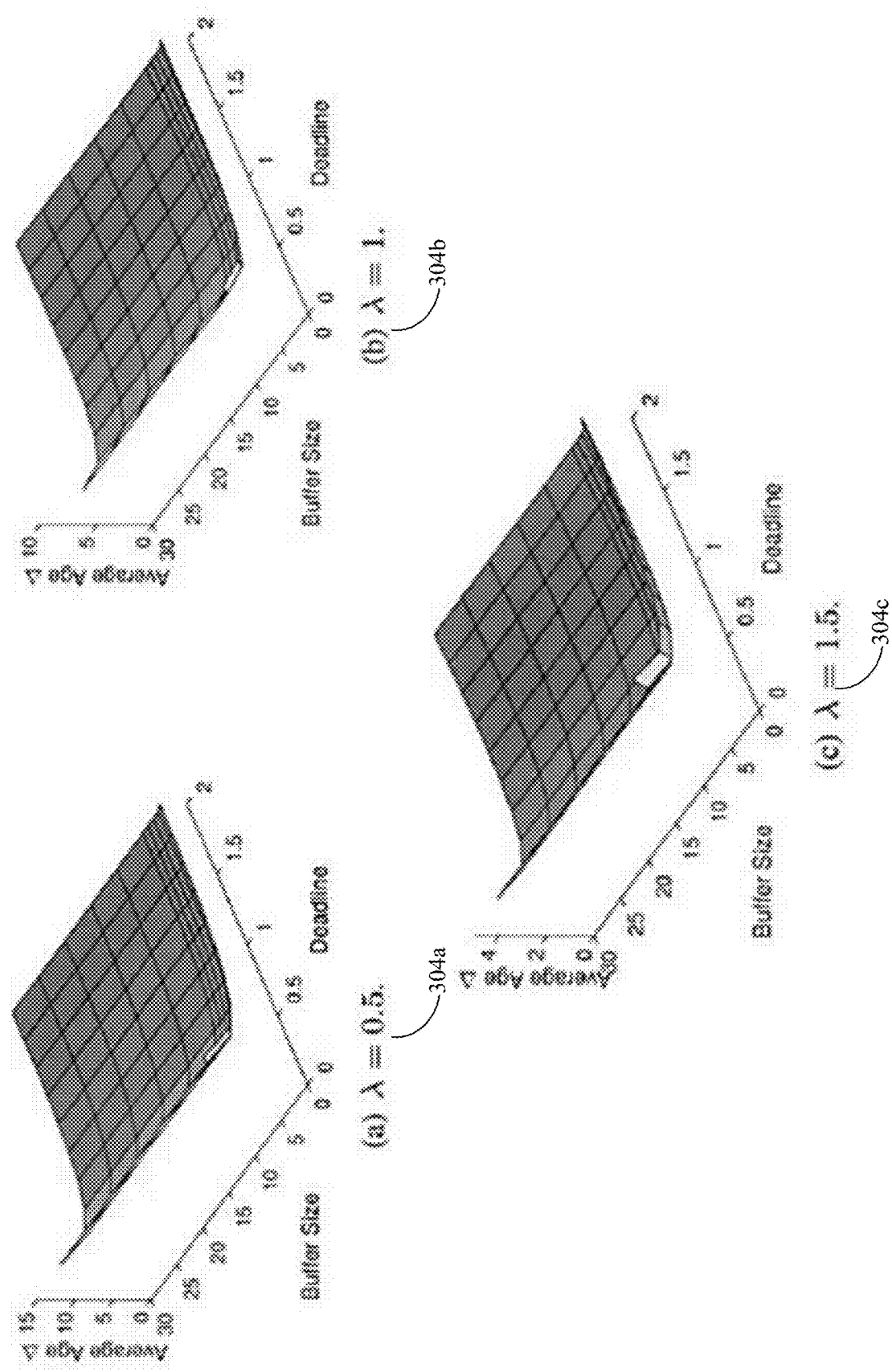
FIG. 3B shows a series of simulation results for age averaged over time for am M/M/l/k queue with a service rate of $\mu=1$ in preemptive mode in accordance with an embodiment of the present disclosure.

FIG. 3B shows a series of simulation results for age averaged over time for am M/M/l/k queue with a service rate of $\lambda=1$ in preemptive mode in accordance with an embodiment of the present disclosure. For all $\lambda$, the age is relatively large at smaller deadlines because the packets in the server are now also subject to a deadline, so most packets are dropped. As the deadline starts increasing, the age starts to decrease. Exemplary ages and optimum deadline and buffer sizes are provided in Table 2. We observe that the optimum deadline decreases as $\lambda$ increases. As in the case with packet control in the buffer only, the buffer size does not show as clear of a trend. In this case, the average age is less sensitive to the buffer size once it is sufficiently large (~1). Overall, we observe that the ability to drop packets in the server using a deadline can improve the age by as much as 33% when compared to only dropping packets in the buffer.

TABLE 2

Optimum average age, preemptive mode

| $\lambda$ | Minimum Age | Optimal Buffer Size | Optimal Deadline | % Improvement vs. Buffer Only |
|---|---|---|---|---|
| 0.5 | 3.0305 | 24 | 2 | 6.05% |
| 1 | 1.9034 | 14 | 1.6 | 22.16% |
| 1.5 | 1.4820 | 14 | 1.2 | 33.75% |

6. Exemplary Method for Removing Packets

Figure 4:
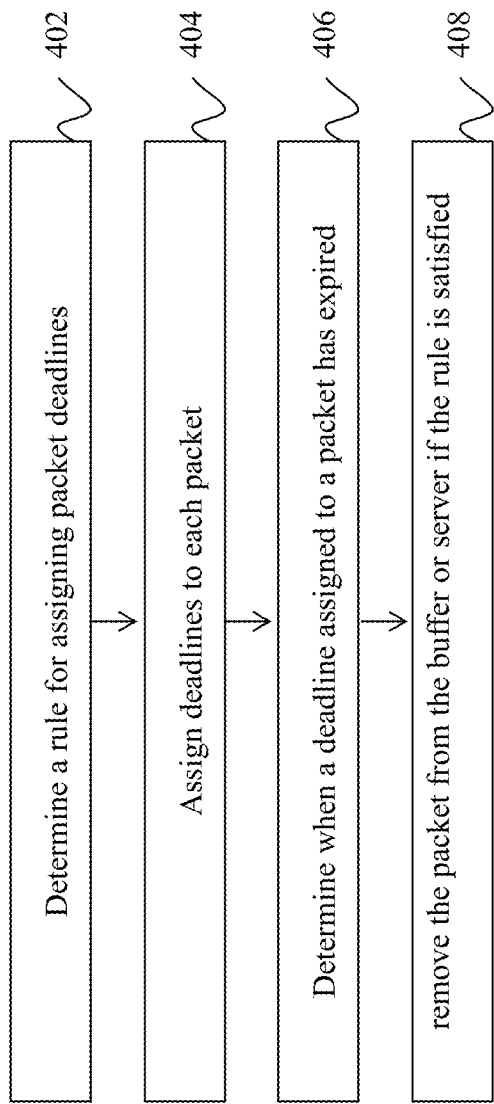
FIG. 4 is a flowchart of an exemplary method for removing packets with expired deadlines from a queue in accordance with an embodiment of the present disclosure.

FIG. 4 is a flowchart of an exemplary method for removing packets with expired deadlines from a queue in accordance with an embodiment of the present disclosure. In optional step 402, a rule for assigning packet deadlines is determined. For example, in an embodiment, controller 210 can determine (e.g., based on preconfigured information, user input, current operating conditions, etc.) and assign a deadline for packets in buffer 202. In an embodiment, controller 210 can set the deadline based on the type of information in the packet, and the deadlines can vary among types of packets in buffer 202. In an embodiment, source 102 stores a policy in a memory accessible by controller 210 that sets rules for determining deadlines for each packet, and controller 210 can access this policy to determine packet deadlines.

In step 404, deadlines are assigned to each packet. For example, in an embodiment, controller 210 can assign deadlines to each packet from data gatherer 214 as they enter buffer 202. In step 406, it is determined when a deadline assigned to each packet has expired. For example, in an embodiment, controller 210 can monitor packet deadlines in buffer 202 (and server 204 if source 102 is operating in preemptive mode). In an embodiment, controller 210 can determine whether the deadline for a particular packet expired (e.g., based on the current time and the deadline assigned to each packet).

In step 408, the packet is removed from the buffer or server if the rule is satisfied. For example, in an embodiment, controller 210 can determine (e.g., based on preconfigured information, a command from a user, determined current operating conditions, etc.) whether source 102 is operating in non-preemptive mode or preemptive mode. Based on the determined mode and the rule, controller 210 can determine whether to remove a packet with an expired deadline.

7. Age vs. Delay vs. Throughput

In an embodiment, source 102 (e.g., using controller 210 in an embodiment) can determine whether to optimize the update rate (e.g., the rate at which updates for information are sent to monitor 106) based on age (e.g., how old the information is), delay (e.g., the difference between the time a packet is queued for transmission and when it reaches the destination without conveying the freshness of information at monitor 106 at any given time), and throughput (e.g., the rate at which packets are delivered). For example, in an embodiment, packets can be delivered at a high rate (i.e., throughput) at the expense of freshness (e.g., packets aging in queues).

Figure 5:
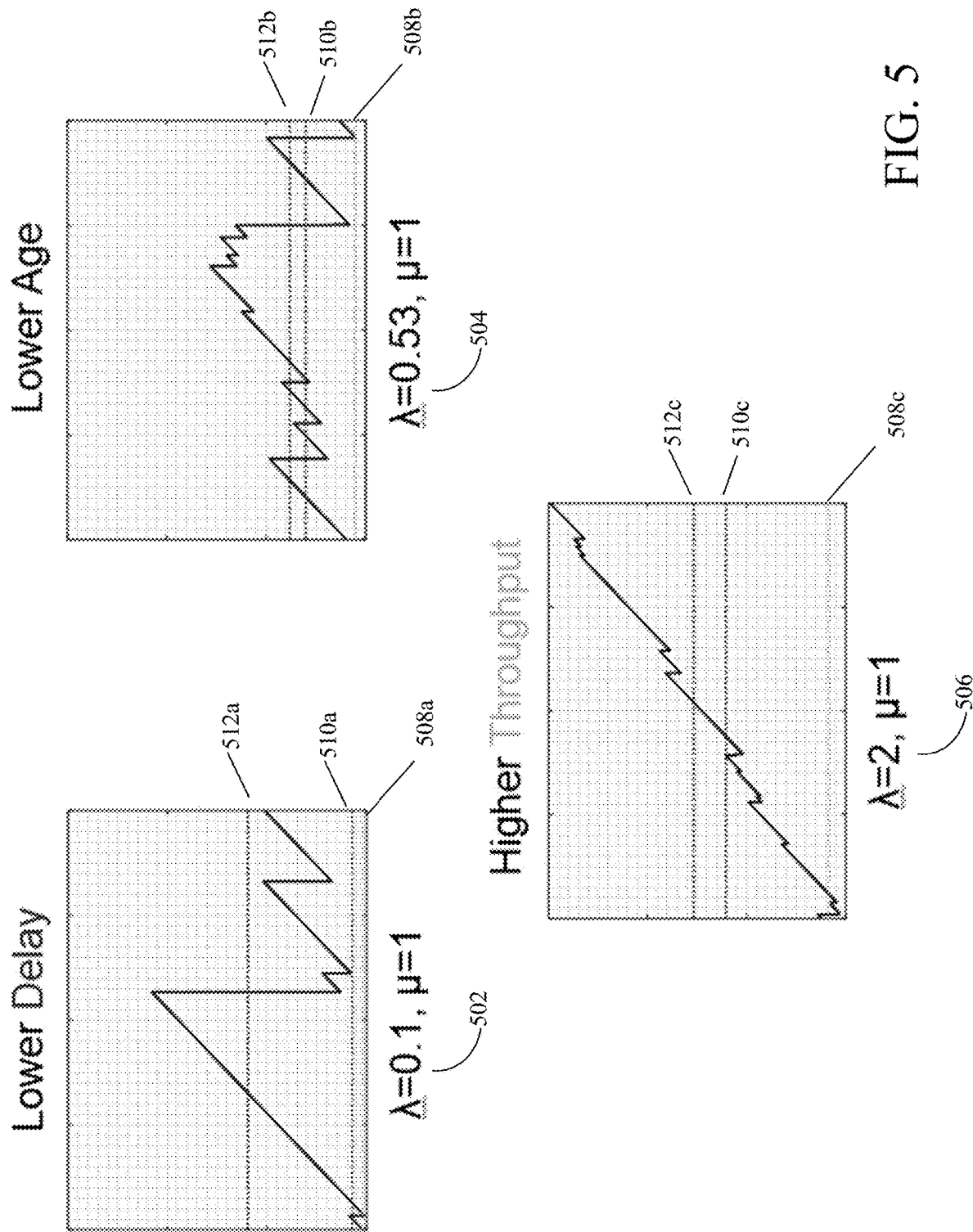
FIG. 5 shows graphs illustrating exemplary tradeoffs of delay, age, and throughput in accordance with an embodiment of the present disclosure.

FIG. 5 shows graphs 502, 504, and 505 illustrating exemplary tradeoffs of delay, age, and throughput in accordance with an embodiment of the present disclosure. In each of graphs 502, 504, and 506, time is plotted on the horizontal axis, and the age of information is plotted on the vertical axis. Further, in each of graphs 502, 504, and 506, the bottom dotted line 508 shows throughput, the middle dotted line 510 shows delay, and the top dotted line 512 shows age of information. Graph 502 shows a plot of age of information when a source 102 (e.g., using controller 210 in an embodiment) optimizes the update rate based on delay. Graph 504 shows a plot of age of information when a source 102 (e.g., using controller 210 in an embodiment) optimizes the update rate based on age. Graph 506 shows a plot of age of information when a source 102 (e.g., using controller 210 in an embodiment) optimizes the update rate based on throughput.

8. Exemplary Internet of Things Embodiment

Figure 6:
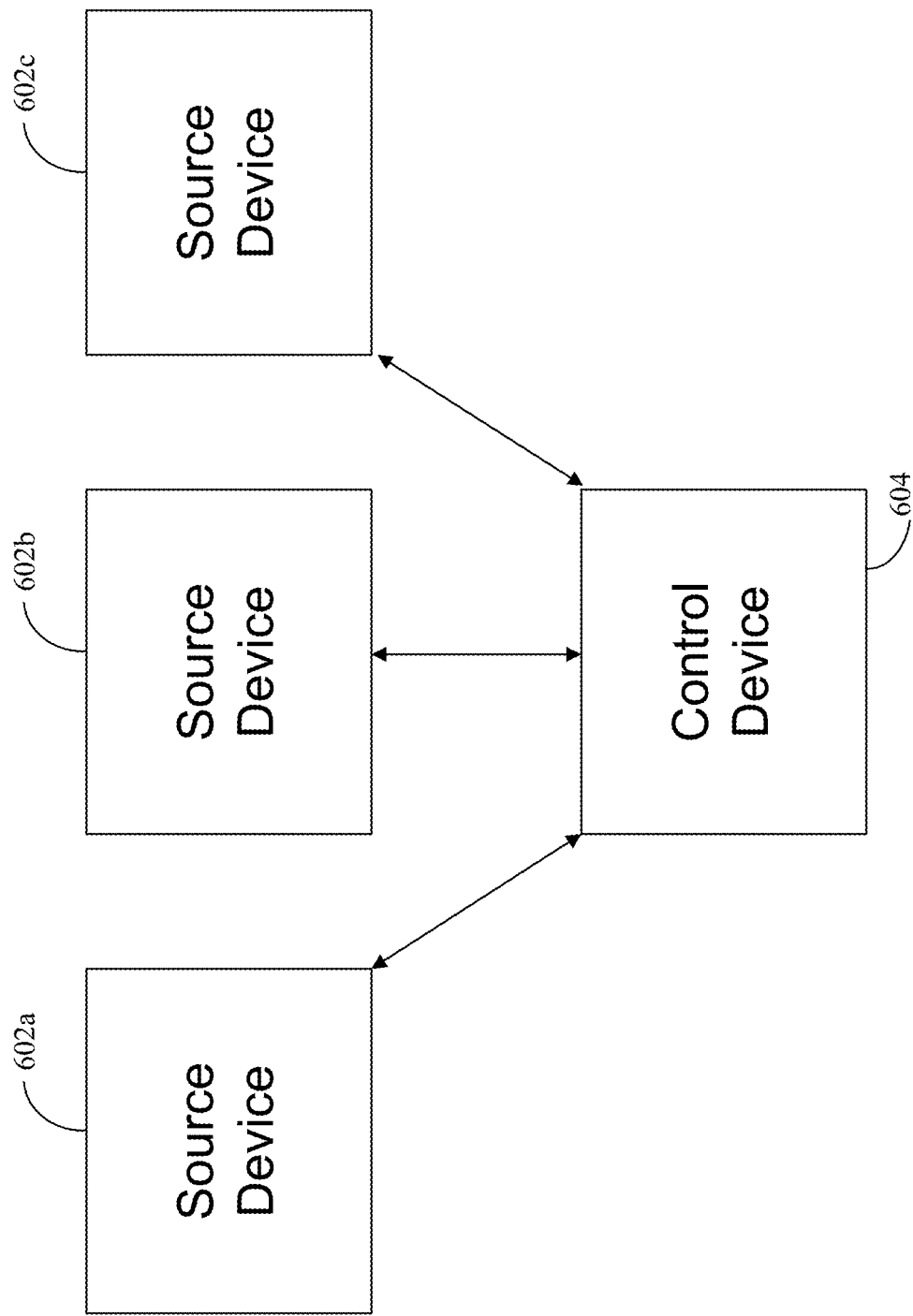
FIG. 6 is a diagram of an exemplary Internet of Things embodiment of the present disclosure.

FIG. 6 is a diagram of an exemplary Internet of Things (IoT) embodiment of the present disclosure. In FIG. 6, controller 210 is implemented on a control device 604 in communication over a network (e.g., a local area network (LAN), a wireless network, Bluetooth, Ethernet, or the Internet) with a plurality of source devices 602. For example, in an embodiment, source devices 602 and control device 604 communicate wirelessly in a home network of a user.

In an embodiment, each of source devices 602 is a special purpose device configured to gather input data 212 and output data 216. Each of source devices 602 can include any of the functionality of source 102 in accordance with an embodiment of the present disclosure. In an embodiment, each of source devices 602 includes at least buffer 202. In an embodiment, any (or all) of source devices can also include controller 210. In an embodiment, control device 604 is configured to function as monitor 106. In an embodiment, control device 604 is configured to gather information from source devices 602 and transmit the information to monitor 106. In an embodiment, each of source devices 602 transmits information to monitor 106, and controller 604 determines whether to remove packets at each of source devices 602 (e.g., based on rules stored on control device 604). In an embodiment, control device 604 can also be a source device that is configured to gather information as well as determine whether to remove packets from control device 604 and source devices 602.

For example, in an embodiment, control device 604 can be implemented as part of a mobile phone of a user and can communicate wirelessly in a home network of a user with source devices 602. In an embodiment, control device 604 can be implemented as a special purpose standalone device configured to control source devices 602. For example, in an embodiment, source device 602a can be a television, source device 602b can be a thermostat, and source device 602c can be a video camera configured to record video inside or outside the home of the user. While three source devices 602 are shown in FIG. 6, it should be understood that any number of source devices 602 can be configured to communicate with control device 604 in accordance with embodiments of the present disclosure.

In an embodiment, each of source devices 602 can send updates to control device 604 (and/or to another device or devices). In an embodiment, control device 604 can determine how often these updates should be sent and can determine rules for removing expired packets at each of source devices 602a. In accordance with embodiments of the present disclosure, control device 604 can optimize information stored by and transmitted from source devices 602 (e.g., to minimize age of information and maximize information freshness).

9. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A source device, comprising:
a buffer configured to store a plurality of packets, wherein each packet in the plurality of packets contains status update information corresponding to an observation of a status, and wherein each packet in the plurality of packets is associated with a timestamp generated based on a respective time of observation of the status;

a server, coupled to an output of the buffer, configured to store a server packet; and a controller coupled to the buffer, wherein the controller is configured to:

assign, based on respective timestamps of each packet in the plurality of packets, respective packet deadlines to each packet in the plurality of packets, determine when a first packet deadline assigned to a first packet in the plurality of packets has expired, remove the first packet from the buffer in response to determining that the first packet deadline has expired, determine whether the source device is operating in preemptive mode or non-preemptive mode, determine whether a second packet deadline assigned to the server packet has expired, and remove the server packet from the server in response to determining that the second packet deadline has expired and that the source device is operating in preemptive mode.

2. The source device of claim 1, wherein the controller is configured to assign the first packet deadline based on a rate that the plurality of packets enter the buffer.

3. The source device of claim 1, wherein the controller is configured to assign the first packet deadline based on a rate that the plurality of packets leave the buffer.

4. The source device of claim 1, wherein the controller is configured to assign the first packet deadline based on a policy accessible by the controller.

5. The source device of claim 1, wherein the controller is configured to modify the first packet deadline.

6. The source device of claim 1, further comprising:
a data gatherer configured to:
receive input data;
packetize the input data; and
transmit the input data to the buffer.

7. The source device of claim 6, wherein the data gatherer includes a sensor.

8. The source device of claim 1, wherein the controller is configured to optimize a rate at which information is transmitted from the buffer to a monitor device.

9. The source device of claim 8, wherein the controller is configured to optimize the rate based on age of information in the buffer.

10. The source device of claim 1, wherein the controller is further configured to calculate an approximate time for the first packet to reach a destination device.

11. The source device of claim 10, wherein the controller is further configured to remove the first packet from the buffer in response to determining that the first packet deadline will expire before the first packet reaches the destination device.

12. A method, comprising:
assigning, using a controller device, respective packet deadlines to each packet in a plurality of packets stored in a buffer, wherein each packet in the plurality of packets contains status update information corresponding to an observation of a status, wherein each packet in the plurality of packets is associated with a timestamp generated based on a respective time of observation of the status, and wherein the packet deadlines are assigned based on respective timestamps of each packet in the plurality of packets;

determining, using the controller device, when a first packet deadline assigned to a first packet in the plurality of packets has expired;

removing, using the controller device, the first packet from the buffer in response to determining that the first packet deadline has expired;

determining whether a preemptive mode or a non-preemptive mode is being used;

determining whether a second packet deadline assigned to a server packet stored in a server has expired; and removing the server packet from the server in response to determining that the second packet deadline has expired and that the preemptive mode is being used.

13. The method of claim 12, further comprising:
assigning the first packet deadline based on a rate that the plurality of packets enter the buffer.

14. The method of claim 12, further comprising:
assigning the first packet deadline based on a rate that the plurality of packets leave the buffer.

15. The method of claim 12, further comprising:
assigning the first packet deadline based on a policy accessible by the controller.

16. The source device of claim 1, wherein the controller is further configured to assigned the respective packet deadlines to each packet in the plurality of packets based on an age of information in each packet in the plurality of packets.

* * * * *